2 Sheets—Sheet 1.

M. R. SHALTERS & S. RAY,

Assignor, by mesne assignments, to W. H. BEEBE.

Mowing Machine.

No. 9,381. Reissued Sept. 21, 1880.

Witnesses

W C Corlies

Jno. C. MacGregor,

Inventors

Moses R. Shalters

And

Samuel Ray

By Coburn & Thacher

Attorneys

N. PETERS, PHOTO-LITHOGRAPHER, WASHINGTON, D. C.

2 Sheets—Sheet 2.

M. R. SHALTERS & S. RAY,

Assignor, by mesne assignments, to W. H. BEEBE.

Mowing Machine.

No. 9,381. Reissued Sept. 21, 1880.

Witnesses

W. C. Collier

Jno. C. MacGregor

Inventors

Moses R Shalters

And

Samuel Ray

By Coburn & Thacher

Attorneys

N. PETERS, PHOTO-LITHOGRAPHER, WASHINGTON, D. C.

UNITED STATES PATENT OFFICE.

MOSES R. SHALTERS AND SAMUEL RAY, OF ALLIANCE, OHIO, ASSIGNORS, BY MESNE ASSIGNMENTS, TO WM. H. BEEBE, OF CHICAGO, ILLINOIS.

MOWING-MACHINE.

SPECIFICATION forming part of Reissued Letters Patent No. 9,381, dated September 21, 1880.

Original No. 118,284, dated August 22, 1871; antedated August 11, 1871. Application for reissue filed August 23, 1880.

*To all whom it may concern:*

Be it known that we, MOSES R. SHALTERS and SAMUEL RAY, of Alliance, in the county of Stark and State of Ohio, have invented certain new and useful Improvements in Mowing-Machines, which are fully set forth in the following specification, reference being had to the accompanying drawings, in which—

Figure 1:
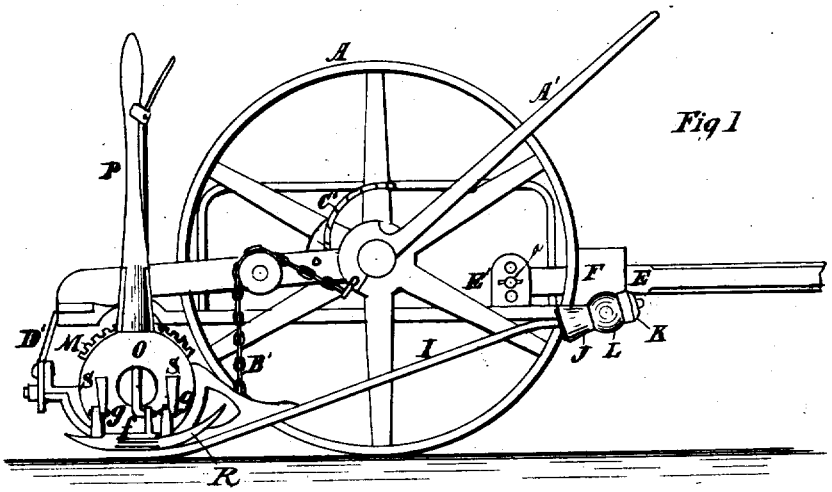
Figure 2:
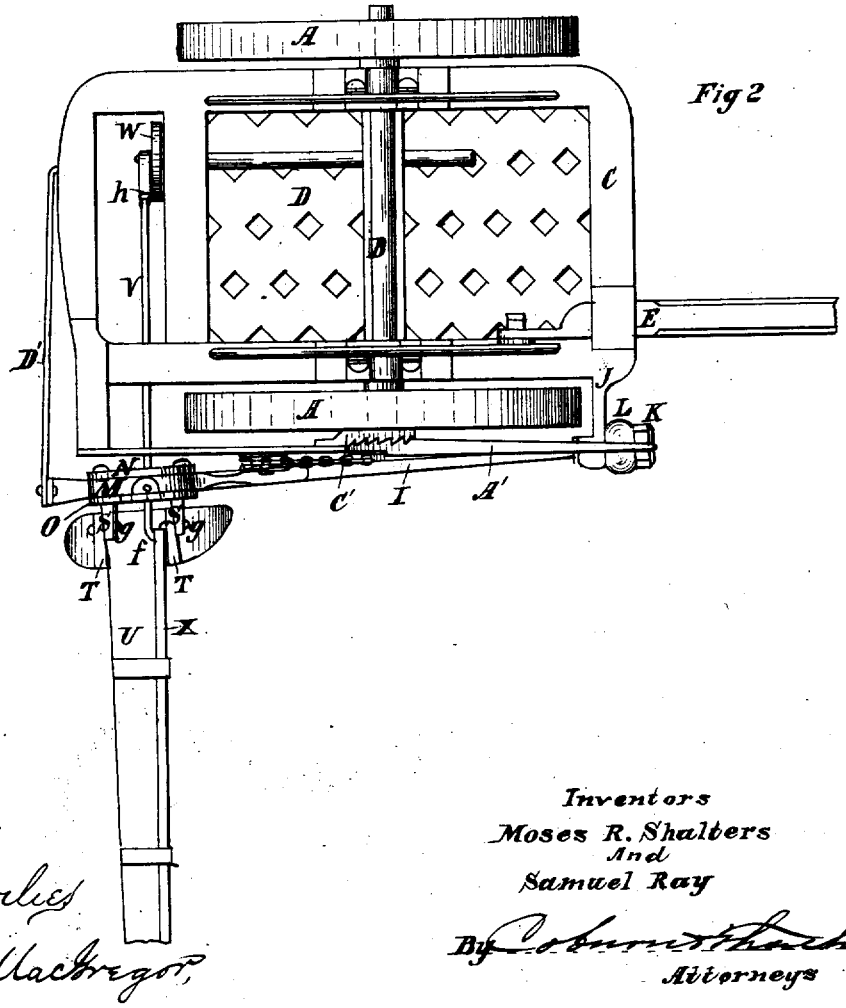
Figure 3:
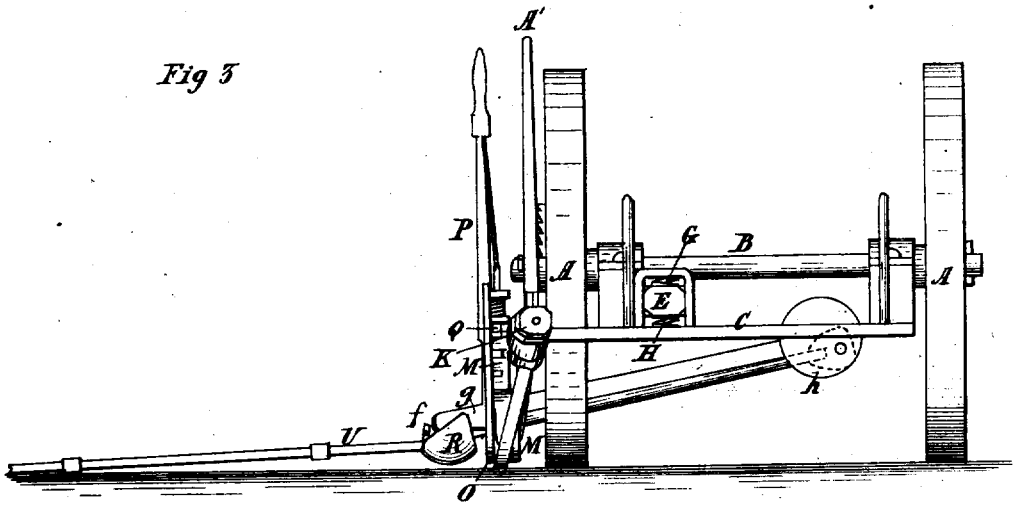
Figure 4:
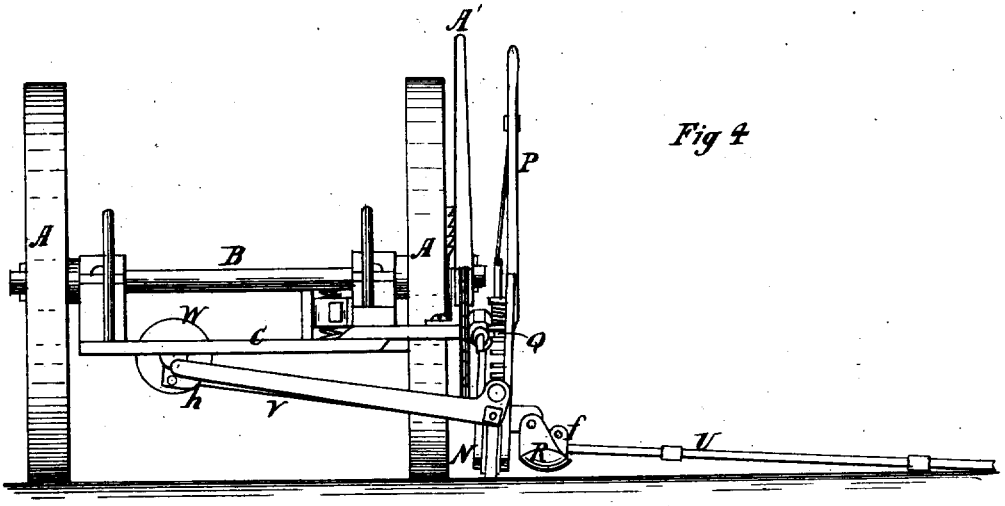

Figure 1 represents a side elevation of a machine embodying our improvements; Fig. 2, a plan view of same; Fig. 3, a front elevation of same, and Fig. 4 a rear elevation of the same.

Our invention relates to that class of machines in which a drag-bar is used for carrying the finger-beam forward over the ground and the shoe is connected to the drag-bar so as to be vibrated independently of the latter and the coupling-arm to raise and depress the fingers to change their pitch.

The invention consists in the combination of a drag-bar, a shoe carrying the finger-beam and attached to the drag-bar by a hinge-connection which permits a rocking movement, and a lever supported on the drag-bar, whereby the shoe and finger-beam are rocked or tilted.

It also consists in the combination of a drag-bar, a shoe carrying the finger-beam and attached to the drag-bar so as to permit a rocking movement, a lever supported on the drag-bar for vibrating the shoe, and a locking device whereby the shoe may be held up in any position to which it may be adjusted.

It also consists in other special combinations of devices, which will be hereinafter named and described, and the particular combinations pointed out definitely in the claims.

We will now proceed to describe the several parts of a machine in which we have in one way embodied our invention, and, following, will point out the particular improvements which it is desired to secure by Letters Patent.

In the drawings like letters of reference refer to like parts in the several figures, and in said drawings, A A represent the drive-wheels of the machine, from the shaft B of which is suspended a frame, C, having a perforated bottom, D. The tongue or pole E is pivoted at its rear end to the said frame at the point *a*, and it is furthermore secured to the frame by a stay or loop, F, through which it loosely passes. Above and below the pole, and immediately within the stay, are springs G H, the use of which will be mentioned presently.

The drag-bar I is attached at its forward end to the front part of the machine by means of an arm, J, through which it passes loosely. The nut K is turned on the extreme forward end of the drag-bar, and between it and the side of the sleeve of the arm through which the bar slides a rubber collar, L, is interposed.

At the rear end of the drag-bar is a toothed segment, M, connected rigidly to the bar, and disks N O are secured on each side of the segment, respectively, by means of a bush or sleeve projecting from one of said disks into and through an eye in the center of the segment, to which bush the other is bolted or otherwise secured. By this means the two disks are made to fit closely, but not tightly, to the sides of the segment, and may be rotated or oscillated by means of a lever, P, attached to one of the disks.

The pawl Q, provided with a downwardly-acting spring, engages with the notches on the segment-plate, and thus locks the lever and disks in any position to which they may be adjusted.

The shoe R is hinged to the outer disk, O, by means of lugs S projecting from the face of the disk O, to which corresponding lugs T on the shoe are pivoted by means of suitable bolts. The finger-bar U is attached to the shoe in the usual way. Obviously, therefore, the oscillation of the disks by means of the hand-lever will tilt the shoe and rock the finger-beam, thereby changing the angle of the fingers and cutters with reference to the ground over which they are being drawn. At the same time the outer end of the finger-beam may be raised and lowered in a plane perpendicular to the path of the machine for the purpose of avoiding large obstructions.

The rear end of the drag-bar is connected to the lower end of the lever A′ by means of a chain, B′, so that by moving said lever in the proper direction the rear end of the drag-bar, together with the shoe and finger-beam, can be raised from the ground. The lever A′ engages with the teeth of the rack C′, and thereby the drag-bar and parts connected thereto may be secured and held up in any desired position.

The ordinary transverse coupling arm or brace D′ (such as is usually employed in drag-bar machines) is pivoted at its upper end to the main frame, and at its lower end is connected rigidly to the drag-bar. This brace prevents all lateral movement of the drag-bar, but at the same time allows to it a free vertical movement.

From the description above, obviously the tilting of the shoe and finger-beam is entirely independent of the drag-bar and coupling-arm—that is, neither of the latter devices is moved or in any way disturbed by the rocking of the finger-beam to change the angle of presentation or the raising and lowering of the outer end of the finger-beam.

The pitman V is connected at one end to the wrist of the crank-wheel W, near which a swivel-joint, *h*, is made in the pitman, to provide for the rocking motion of the finger-beam. The outer end of the pitman is connected to the cutter-bar by a pivotal joint the axial line of which coincides, or nearly so, with the axial line of the pivot *g*, whereby the shoe is connected to the disk O. The pitman will therefore work more nearly in a right line with the horizontal movement of the cutter-bar, more especially when the finger-beam is raised or depressed from a horizontal position. In either of these positions the pitman will work with less strain upon the cutter-bar.

The springs G H upon the pole are for the purpose of relieving the neck of the team from severe strain in the event that the machine, while running, passes over rough and uneven ground, and the rubber collar L prevents injury to the finger-bar if it runs against an obstruction or is subjected in any way to unusual strain.

In machines of this kind, if the tilting-lever is mounted on the main frame, its relation to the shoe is changed when the finger-beam is carried forward over rough and uneven ground, so that there will sometimes be undue strain upon the lever and its connection to the shoe, and at other times the said connection will be too slack, and the tilting of the shoe and finger-beam rendered uncertain. These difficulties are entirely overcome by mounting or supporting the tilting-lever on the drag-bar so that it moves with the bar, and consequently retains the same relation to the shoe.

Having thus described our invention, what we claim as new, and desire to secure by Letters Patent, is—

1. The combination, in a harvesting-machine, of the following elements: a drag-bar, a shoe attached to the drag-bar by a hinge-connection, which permits the shoe to be vibrated or tilted in the direction of its length, a finger-beam attached to the shoe, and a lever mounted or supported on the drag-bar, whereby the front end of the shoe may be raised at will by the driver on the machine.

2. The combination, in a harvesting-machine, of the following elements: a drag-bar, a shoe attached to the drag-bar by a hinge-connection, which permits the shoe to be vibrated or tilted in the direction of its length, a lever mounted or supported on the drag-bar for lifting the forward end of the shoe, and a locking device for locking the lever to hold the shoe in position when lifted.

3. The combination, in a harvesting-machine, of the following elements: a drag-bar, a transverse coupling arm or brace hinged or pivoted at its inner end to the main or supporting frame, a shoe attached to the drag-bar by a hinge-connection independently of the coupling-arm, which permits the shoe to be vibrated or tilted in the direction of its length, a finger-beam attached to the shoe, and a lever mounted or supported on the drag-bar, whereby the shoe may be tilted and the finger-beam rocked without disturbing the coupling-arm and drag-bar.

4. The combination, in a harvesting-machine, of the following elements: a drag-bar, a shoe carrying the finger-beam and attached to the drag-bar by a hinge-connection, which permits the shoe to be tilted in a direction transverse to the finger-beam, and a lever mounted or supported on the drag-bar and connected to the shoe by a device which enables the shoe to be vibrated positively in both directions.

5. The combination, in a harvesting-machine, of the following elements: a drag-bar, a shoe carrying the finger-beam and attached to the drag-bar by a hinge-connection, which permits the shoe to be tilted in a direction transverse to the finger-beam, a lever mounted or supported on the drag-bar and connected to the shoe so as to vibrate the latter positively in both directions, and a locking device, whereby the shoe may be secured firmly in any position to which it may be adjusted.

6. The combination, in a harvesting-machine, of the following elements: a drag-bar, a transverse coupling arm or brace connected at one end to the drag-bar and hinged at the other to the main frame, a shoe carrying the finger-beam and attached to the drag-bar by a hinge-connection independent of the coupling-arm, which permits the shoe to be tilted transversely of the finger-beam, a lever mounted or supported on the drag-bar and connected to the shoe, and a locking device, whereby the shoe and finger-beam may be tilted independently of the coupling-arm and secured permanently in any position to which it may be adjusted.

7. The ratchet-wheel M and disks O N, in combination with the drag-bar I, these parts being constructed substantially as described, and for the purpose set forth.

8. The combination of the spring-catch lever P, ratchet-wheel M, disks O and N, drag-bar I, and shoe R with the pitman V, having the swivel-joint *h*, the cutter-bar X, and finger-bar U, these parts being constructed and arranged in the manner and for the purpose described.

MOSES R. SHALTERS.
SAMUEL RAY.

Witnesses:
A. L. JONES,
J. W. MCFARLAND.